(12) United States Patent
Kanazawa et al.

(10) Patent No.: US 8,308,943 B2
(45) Date of Patent: Nov. 13, 2012

(54) HOLLOW FIBER MEMBRANE MODULE AND FUEL CELL SYSTEM

(75) Inventors: Hirofumi Kanazawa, Toyota (JP); Toshiyuki Kondo, Chiryu (JP); Hiroyasu Shirakawa, Kikugawa (JP)

(73) Assignees: Toyota Jidosha Kabushiki Kaisha, Toyota-shi (JP); NOK Corporation, Minato-ku (JP)

( * ) Notice: Subject to any disclaimer, the term of this patent is extended or adjusted under 35 U.S.C. 154(b) by 636 days.

(21) Appl. No.: 12/447,696

(22) PCT Filed: Oct. 22, 2007

(86) PCT No.: PCT/JP2007/070967
§ 371 (c)(1),
(2), (4) Date: Apr. 29, 2009

(87) PCT Pub. No.: WO2008/059707
PCT Pub. Date: May 22, 2008

(65) Prior Publication Data
US 2010/0068603 A1    Mar. 18, 2010

(30) Foreign Application Priority Data
Nov. 13, 2006    (JP) .................................. 2006-307054

(51) Int. Cl.
*B01D 63/02*    (2006.01)
*H01M 8/00*    (2006.01)
*B01D 35/28*    (2006.01)
*H01M 8/02*    (2006.01)

(52) U.S. Cl. .................. 210/321.9; 210/321.8; 210/247; 210/456; 429/400; 429/512

(58) Field of Classification Search .................. None
See application file for complete search history.

(56) References Cited

U.S. PATENT DOCUMENTS

| | | | | |
|---|---|---|---|---|
| 4,396,510 A | * | 8/1983 | Hsei | 210/321.8 |
| 5,137,531 A | * | 8/1992 | Lee et al. | 422/46 |
| 5,174,900 A | * | 12/1992 | Nichols et al. | 210/651 |
| 5,738,785 A | * | 4/1998 | Brown et al. | 210/232 |
| 2001/0035374 A1 | | 11/2001 | Yamamoto et al. | |
| 2003/0226793 A1 | * | 12/2003 | Merritt et al. | 210/206 |
| 2005/0115889 A1 | * | 6/2005 | Schaevitz et al. | 210/490 |

FOREIGN PATENT DOCUMENTS

| | | |
|---|---|---|
| DE | 101 02 358 A1 | 8/2001 |
| EP | 0 585 614 A2 | 3/1994 |

(Continued)

*Primary Examiner* — Krishnan S Menon
*Assistant Examiner* — Katherine Zalasky
(74) *Attorney, Agent, or Firm* — Kenyon & Kenyon LLP

(57) ABSTRACT

In a humidifying membrane module, a humidifying membrane having plural hollow fiber membranes bundled together is housed in a humidifying membrane chassis having a cylindrical outer periphery, and the humidifying membrane chassis is housed in an assembly chassis having a cylindrical inner periphery. The assembly chassis has an inlet port for taking air that is made to flow into hollow parts of the humidifying membrane, an outlet port for discharging the air, an inlet port for taking an off-gas that is made to flow in gaps in the humidifying membrane, and an outlet port for discharging the off-gas. The air and the off-gas flow in flow paths formed by utilizing the humidifying membrane chassis and the assembly chassis, but are not mixed with each other at positions other than the humidifying membrane owing to annular sealing members provided between the humidifying chassis and the assembly chassis.

14 Claims, 5 Drawing Sheets

FOREIGN PATENT DOCUMENTS

| | | |
|---|---|---|
| EP | 0 627 254 A1 | 12/1994 |
| EP | 1 005 896 A1 | 6/2000 |
| EP | 1 864 709 A2 | 12/2007 |
| JP | 56-020045 B2 | 5/1981 |
| JP | 56-040435 Y2 | 9/1981 |
| JP | 57-122293 A | 7/1982 |
| JP | 59-123519 U | 8/1984 |
| JP | 2001-201122 A | 7/2001 |
| JP | 2001-202977 A | 7/2001 |
| JP | 2002-219339 A | 8/2002 |
| JP | 2003-065566 A | 3/2003 |
| JP | 2004-049976 A | 2/2004 |
| JP | 2004-202478 A | 7/2004 |
| JP | 2005-224719 A | 8/2005 |

* cited by examiner

HOLLOW FIBER MEMBRANE MODULE AND FUEL CELL SYSTEM

This is a 371 national phase application of PCT/JP2007/070967 filed 22 Oct. 2007, claiming priority to Japanese Patent Application No. JP 2006-307054 filed 13 Nov. 2006, the contents of which are incorporated herein by reference.

TECHNICAL FIELD

The present invention relates to a technique of transporting a fluid component between fluids with hollow fiber membranes.

BACKGROUND ART

A hollow fiber membrane module is a module for transporting a fluid component between a fluid flowing in the hollow part of the hollow fiber membrane and a fluid flowing outside the hollow fiber membrane.

JP-2005-224719 discloses a technique of providing a gasket for preventing leakage between the two fluids. In this technique, protruding head parts are provided near both ends of a hollow fiber membrane bundle, a gasket is provided for sealing between the first chassis enclosing the center part with respect to the head part and the head part, and another gasket is provided for sealing between the second chassis enclosing the outer side with respect to the head part and the head part. The document discloses that the chassis may be of a rectangular cross sectional shape for sealing with the gaskets.

JP-A-2004-202478 discloses a technique of fabricating a hollow fiber membrane module with a hexahedral (with a square cross section) cylindrical chassis. In this technique, a potting layer is provided within the chassis for sealing between the fluids.

JP-2001-201122 and JP-A-2002-219339 each disclose a technique of making a fluid that is flowing outside the hollow fiber membrane homogeneous. In the technique disclosed in JP-A-2001-201122, a chassis enclosing the hollow fiber membrane is provided for guiding the fluid flowing outside the hollow fiber membrane to flow in the direction perpendicular to the hollow fiber membrane. In the technique disclosed in JP-A-2002-219339, the hollow fiber membrane is surrounded with a chassis from the side thereof, and a fluid is made to flow diagonally, upon which the ratio of the width and length of the hollow fiber membrane bundle is set to a suitable value.

In the technique in JP-A-2005-224719, for sealing with a gasket, it is necessary to provide head parts, and to hold the head parts with separate chassis. In the technique in JP-A-2004-202478, it is necessary to attain sealing in a chassis by potting over a wide area.

DISCLOSURE OF THE INVENTION

An object of the invention is to simplify a structure for sealing fluids in a hollow fiber membrane module.

Another object of the invention is to attain sealing of fluids by an embodiment that is different from conventional cases, in the case where a hollow fiber membrane bundle has a rectangular cross sectional shape.

The hollow fiber membrane module of the invention contains: a hollow fiber membrane bundled body that contains a hollow fiber membrane bundle having plural hollow fiber membranes bundled, and has an outer periphery formed into a cylindrical shape along the entire length direction thereof; an outer chassis that has a cylindrical part enclosing the hollow fiber membrane bundled body, and an inner periphery of the cylindrical part being formed into a cylindrical shape along the entire length direction thereof; a first flow path that is formed by utilizing the outer chassis, introduces a first fluid into a hollow part of the hollow fiber membranes at one end of the hollow fiber membrane bundled body, and discharges the first fluid from the hollow part of the hollow fiber membranes at the other end of the hollow fiber membrane bundled body; a second flow path that is formed by utilizing the outer chassis, introduces a second fluid into a space among the hollow fiber membranes on a side surface of the hollow fiber membrane bundled body, and discharges the second fluid from the space among the hollow fiber membranes on a side surface of the hollow fiber membrane bundled body; and an annular sealing member that is provided between the outer periphery of the cylindrical shape of the hollow fiber membrane bundled body and the inner periphery of the cylindrical part of the outer chassis, to seal between a side of the first flow path and a side of the second flow path, and a fluid component is transported between the first fluid and the second fluid through the hollow fiber membranes.

The hollow fiber membrane is formed with a membrane that is formed to be hollow inside and has fine pores as an outer wall, and is typically made of a resin. The hollow fiber membrane has a filter function such that a substance that is smaller than the pores is transmitted and a substance that is larger than the pores is not transmitted between the hollow part and the outside. The hollow fiber membrane bundle contains plural hollow fiber membranes that are bundled. The hollow fiber membrane bundled body contains the hollow fiber membrane bundle and is equipped with another member depending on necessity. For example, the hollow fiber membrane bundled body may be formed by potting with a resin on both ends of the hollow fiber membrane bundle for preventing a fluid from flowing among the hollow fiber membranes from the ends (to the other ends). In the case where the hollow fiber membrane bundled body is produced by processing the hollow fiber membrane bundle, the processing procedures thereof are not particularly limited, and for example, it may be housed in an outer chassis after processing, or may be processed after housing in an outer chassis.

The hollow fiber membranes have an outer periphery formed into a cylindrical shape along the entire length thereof. The length direction means the direction of the fiber length of the hollow fiber membrane. Accordingly, the hollow fiber membranes are formed to have a circular cross-section upon cutting them at a certain position in the fiber length direction or all the positions in the fiber length direction. The cylinder referred herein means a columnar body with a substantially perfectly circular cross section.

The outer chassis has a cylindrical part enclosing the hollow fiber membrane bundled body. An inner periphery of the cylindrical part is formed into a cylindrical shape along the entire length thereof. At least a part of the first flow path is formed by utilizing the outer chassis, and the first fluid flows therein. Specifically, the first flow path exerts a function of introducing the first fluid from the outside into the hollow part of the hollow fiber membranes at one end of the hollow fiber membrane bundled body, and a function of discharging the first fluid from the hollow part of the hollow fiber membranes to the outside at the other end of the hollow fiber membrane bundled body. The first fluid may be a gaseous body or a liquid body, or may be a mixture of a gaseous body and a liquid body. At least a part of the first flow path may be formed by utilizing an inner chassis.

At least a part of the second flow path is formed by utilizing the outer chassis. The second flow path exerts a function of introducing the second fluid from the outside into the space among the hollow fiber membranes on the side surface of the hollow fiber membrane bundled body, and a function of discharging the second fluid from the space among the hollow fiber membranes to the outside on the same side surface or a different side surface of the hollow fiber membrane bundled body. The second fluid may be a gaseous body or a liquid body, or may be a mixture of a gaseous body and a liquid body. The second fluid may be the same as the first fluid, or may be different from the first fluid. At least a part of the second flow path may be formed by utilizing an inner chassis.

The sealing member is an annular member that seals between the side of the first flow path and the side of the second flow path. Specifically, the sealing member seals between the side of the first flow path positioned on the end side of the hollow fiber membrane bundled body and the side of the second flow path positioned on the center side of the hollow fiber membrane bundled body, thereby preventing the first fluid and the second fluid from being mixed. The sealing member is provided between the outer periphery of the cylinder of the hollow fiber membrane bundled body and the inner periphery of the cylinder of the outer chassis to fill up the gap between them, thereby exerting the sealing function. Accordingly, it is preferred that the cylindrical shape of the outer periphery of the hollow fiber membrane bundled body and the cylindrical shape of the inner periphery of the outer chassis be similar to each other, and that the distance between the inner periphery and the outer periphery be substantially constant along the circumferential direction (within the range where the sealing member can be deformed), thereby enhancing the stability of sealing. The annular sealing member is typically formed into a shape corresponding to the inner periphery or the outer periphery. In the case where the sealing member is made of a resin that is elastically deformed easily (e.g. rubber). However, the sealing function can be ensured even when the shape thereof is different from the inner periphery and the outer periphery with the deformation range thereof. The cross section of the annulus of the sealing member is generally formed into a circular or elliptical shape, thereby achieving linear sealing. However, the cross sectional shape may be other shapes, such as a rectangular shape or the like, as long as the sealing function is ensured.

In the hollow fiber membrane module, a fluid component is transported between the first fluid and the second fluid through the hollow fiber membranes. The fluid component is typically a gaseous body or a liquid body mainly constituted by a fluid, and may contain a solid mixed with the fluid. The first fluid and the second fluid are not mixed with each other even though both the flow paths thereof are formed by utilizing the outer chassis since they are sealed with the sealing member. Furthermore, they can be sealed relatively easily since there is no need to seal with a gasket or potting. The sealing member may directly isolate the first flow path and the second flow path from each other, or may be provided supplementarily or auxiliarily in a manner not constituting a wall of one or both of the first flow path and the second flow path. A plurality of the sealing members may be provided.

In one embodiment of the hollow fiber membrane module of the invention, the first flow path has a first inlet flow path that is formed on one end of the hollow fiber membrane bundle and introduces the first fluid to the one end of the hollow fiber membrane bundle, and a first outlet flow path that is formed on the other end of the hollow fiber membrane bundle and discharges the first fluid from the other end of the hollow fiber membrane bundle, and the sealing member seals between the side of the first inlet flow path and the side of the second flow path, or seals between the side of the first outlet flow path and the side of the second flow path. As a matter of course, both the sealing member that seals between the side of the first inlet flow path and the side of the second flow path, and the sealing member that seals between the side of the first outlet flow path and the side of the second flow path, may be provided.

In one embodiment of the hollow fiber membrane module of the invention, the hollow fiber membrane bundled body has an inner chassis having a cylindrical part enclosing the hollow fiber membrane bundled body from the side thereof, and the cylindrical part of the inner chassis is formed to have a cylindrical outer periphery along the entire length thereof. The inner chassis may house the hollow fiber membrane bundle detachably or may be integrated with the hollow fiber membrane bundle. According to the structure, the shape of the hollow fiber membranes can be changed by setting the shape of the inner chassis to a predetermined shape.

In one embodiment of the hollow fiber membrane module of the invention, the second flow path has a second inlet flow path that penetrates the side wall of the inner chassis at a certain position in the length direction thereof and introduces the second fluid into the side surface of the hollow fiber membrane bundle, and a second outlet flow path that penetrates the side wall of the inner chassis at another position in the length direction thereof and discharges the second fluid from the side surface of the hollow fiber membrane bundle, and further has an annular sealing member that is provided between the outer periphery of the cylindrical part of the inner chassis and the inner periphery of the cylindrical part of the outer chassis and seals between the side of the second inlet flow path and the side of the second outlet flow path.

In one embodiment of the hollow fiber membrane module of the invention, the hollow fiber membranes and the inner chassis are produced by using the same resin or different resins that can absorb any difference in thermal expansion between them, the outer chassis is produced by using a metal, and the annular sealing member is produced by using a compressible material that can absorb any difference in thermal expansion between the inner chassis and the outer chassis. The outer chassis is preferably robust from the standpoint of protecting the interior, and a metallic material is employed. In general, a metal is liable to suffer thermal expansion, and the distance to the inner chassis made of a resin, which suffers little thermal expansion, fluctuates. Accordingly, a material that can be elastically deformed to such an extent that it can absorb any difference in thermal expansion is used as the sealing member.

In one embodiment of the hollow fiber membrane module of the invention, a perforated partition plate that expands the second fluid in the cylindrical axial direction and guides it to the side surface of the hollow fiber membrane bundle is provided between the inner chassis and the hollow fiber membrane bundle in the second inlet flow path. A perforated partition plate may be similarly provided in the second outlet flow path. In one embodiment of the hollow fiber membrane module of the invention, the holes of the perforated partition plate are not provided in an area of the partition plate that is directly impacted by the second fluid introduced through the inner chassis. In alternative, the holes are provided in the area to make the hole area smaller than the other positions. The hole area referred to herein is the area of the holes per unit area. Even if the size of the holes is constant, the hole area is decreased when the number of holes is small, and even if the number of holes is constant, the hole area is decreased when the holes are small. In one embodiment of the hollow fiber membrane module of the invention, the hole area of the perforated partition plate increases as the distance from the area of the partition plate that is directly impacted by the second fluid introduced through the inner chassis, is increased in the lengthwise direction. According to the structure, the second fluid can be fed to distant positions.

A fuel cell system according to the invention contains a fuel cell that produces electric power by performing a chemical reaction producing water from supplied hydrogen and oxygen. One of the first fluid and the second fluid is a fluid containing oxygen supplied to the fuel cell, the other thereof is a fluid containing water produced in the fuel cell, and the hollow fiber membrane module transports at least some of the water produced in the fuel cell to the fluid containing oxygen supplied to the fuel cell, so as to humidify the fluid. In a typical embodiment, the fluid containing oxygen supplied to the fuel cell is air, and is supplied to a cathode. The fluid containing water produced in the fuel cell (which may be in a state of water vapor) is a gas discharged from the cathode (off-gas). Water in the off-gas is transported to the gas supplied to the cathode by the hollow fiber membrane module, whereby a humidified gas is supplied to the cathode to improve the operation of the fuel cell.

BEST MODE FOR CARRYING OUT THE INVENTION

Figure 1:
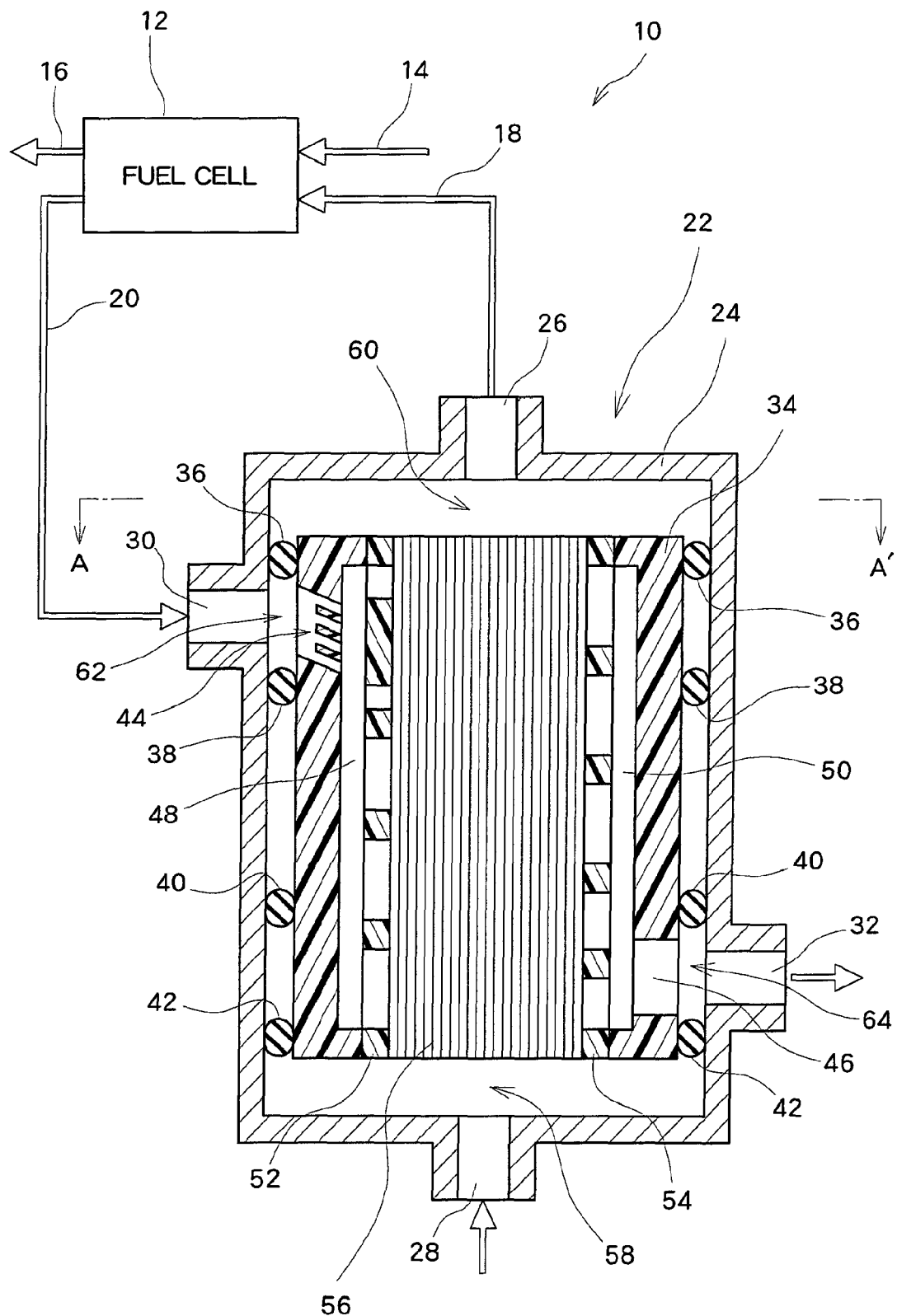
FIG. 1 is a schematic diagram showing an example of a fuel cell system.

FIG. 1 is an illustration showing a schematic structure of a fuel cell system 10. The fuel cell system 10 is mounted, for example, on a fuel cell vehicle and functions as a drive source of the fuel cell vehicle. The fuel cell system 10 contains, as major constitutional components, a fuel cell 12 and a humidifying membrane module 22. Hydrogen gas is supplied to an anode of the fuel cell 12 through a hydrogen supplying path 14, and a used gas is discharged through a hydrogen discharging path 16. Air is supplied to a cathode of the fuel cell 12 from the humidifying membrane module 22 through an air supplying path 18, and a used gas (off-gas) is discharged from an air discharging path 20. The fuel cell 12 produces electric power by utilizing chemical reaction of hydrogen gas and oxygen gas, and supplies the electric power to a motor or the like, which is not shown in the figure. Water (liquid water or water vapor) is formed in the chemical reaction. Water is discharged along with the off-gas through the air discharging path 20.

The humidifying membrane module 22 shown as a cross sectional view is a device that is a hollow fiber membrane module, which humidifies air supplied to the fuel cell 12 with the highly humidified (high water content) off-gas discharged from the fuel cell 12. The humidifying membrane module 22 is enclosed with an assembly chassis 24 made of aluminum or the like. The assembly chassis 24 has ports opened therein including an outlet port 26 and an inlet port 28 for the air, and an inlet port 30 and an outlet port 32 for the off-gas.

Figure 2:
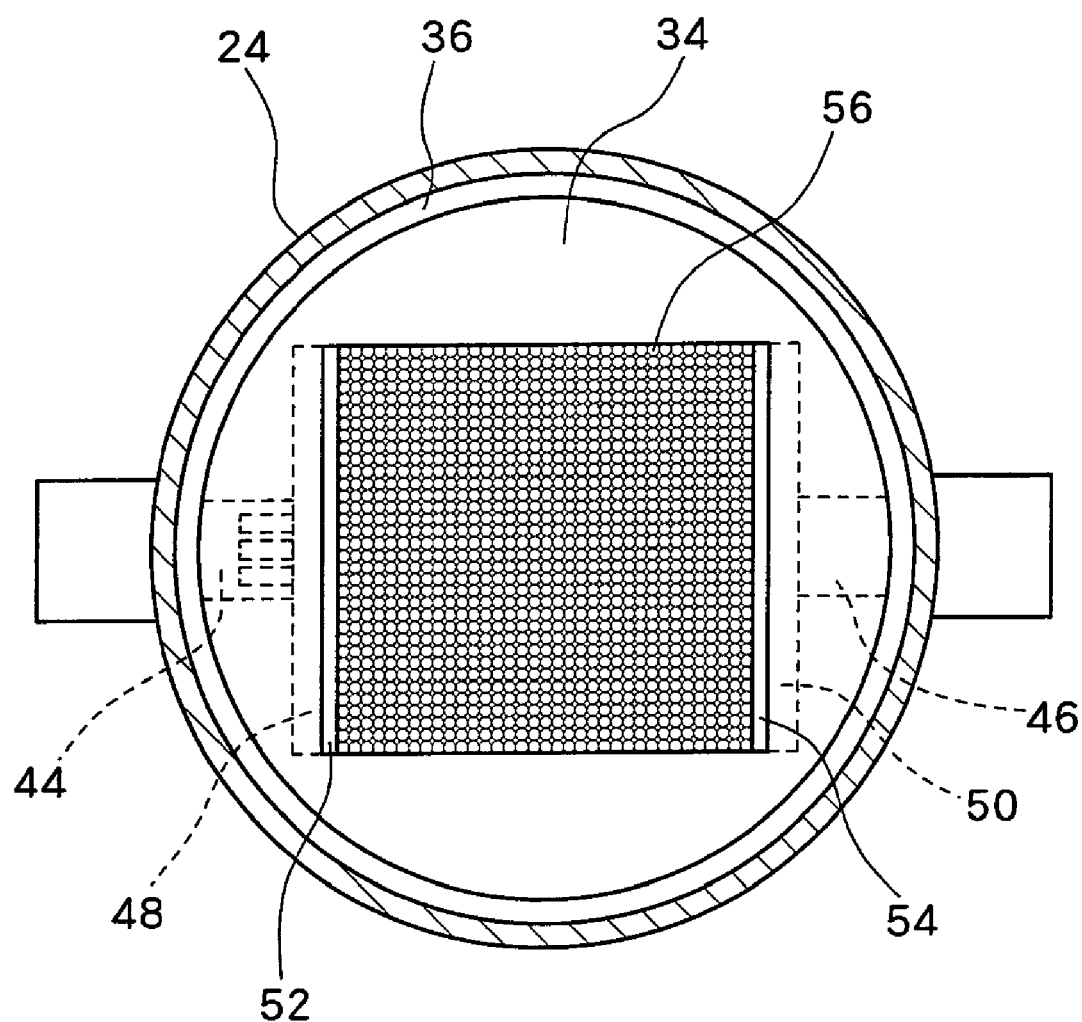
FIG. 2 is a cross sectional view of a humidifying membrane module.

FIG. 2 is a cross sectional view along line A-A' in FIG. 1, showing the humidifying membrane module 22. It will be understood from the figure that the assembly chassis 24 has a circular cross section. That is, the assembly chassis 24 is formed in a cylindrical shape.

The assembly chassis 24 houses inside a humidifying membrane chassis 34 made of a resin and having an outer periphery in a cylindrical shape. Tubular sealing members 36, 38, 40 and 42 made of rubber are provided between the outer periphery of the humidifying membrane chassis 34 and the inner periphery of the assembly chassis 42, thereby achieving linear sealing. The sealing is performed to retain the air and the off-gas within the prescribed regions in the assembly chassis 24.

It will be understood from FIGS. 1 and 2 that in the humidifying membrane chassis 34, a through-hole 44 with a rectifying lattice is provided in the area facing the inlet port of the assembly chassis 24, and connected to a thin rectangular parallelepiped space 48 inside the chassis. The through-hole 44 with a rectifying lattice tilts and descends as it approaches the space 48. The tilt is provided to facilitate the fed off-gas getting to the deeper portion of the space 48. In the humidifying membrane chassis 34, a through-hole 46 is provided in the area facing the outlet port 32 of the assembly chassis 24, and connected to a thin rectangular parallelepiped space 50 inside the chassis. Inside the thin rectangular parallelepiped spaces 48 and 50, thin rectangular plates 52 and 54 are provided. A rectangular parallelepiped humidifying membrane 56 is provided in such a manner that it is held by the plates 52 and 54. The humidifying membrane 56 is fabricated by bundling thin and long hollow fiber membranes, and at the upper end and the lower end thereof, gaps among the hollow fiber membranes are filled up using an adhesive. The humidifying membrane chassis 34 and the plates 52 and 54 are adhered tightly to avoid gaps.

Figure 3:
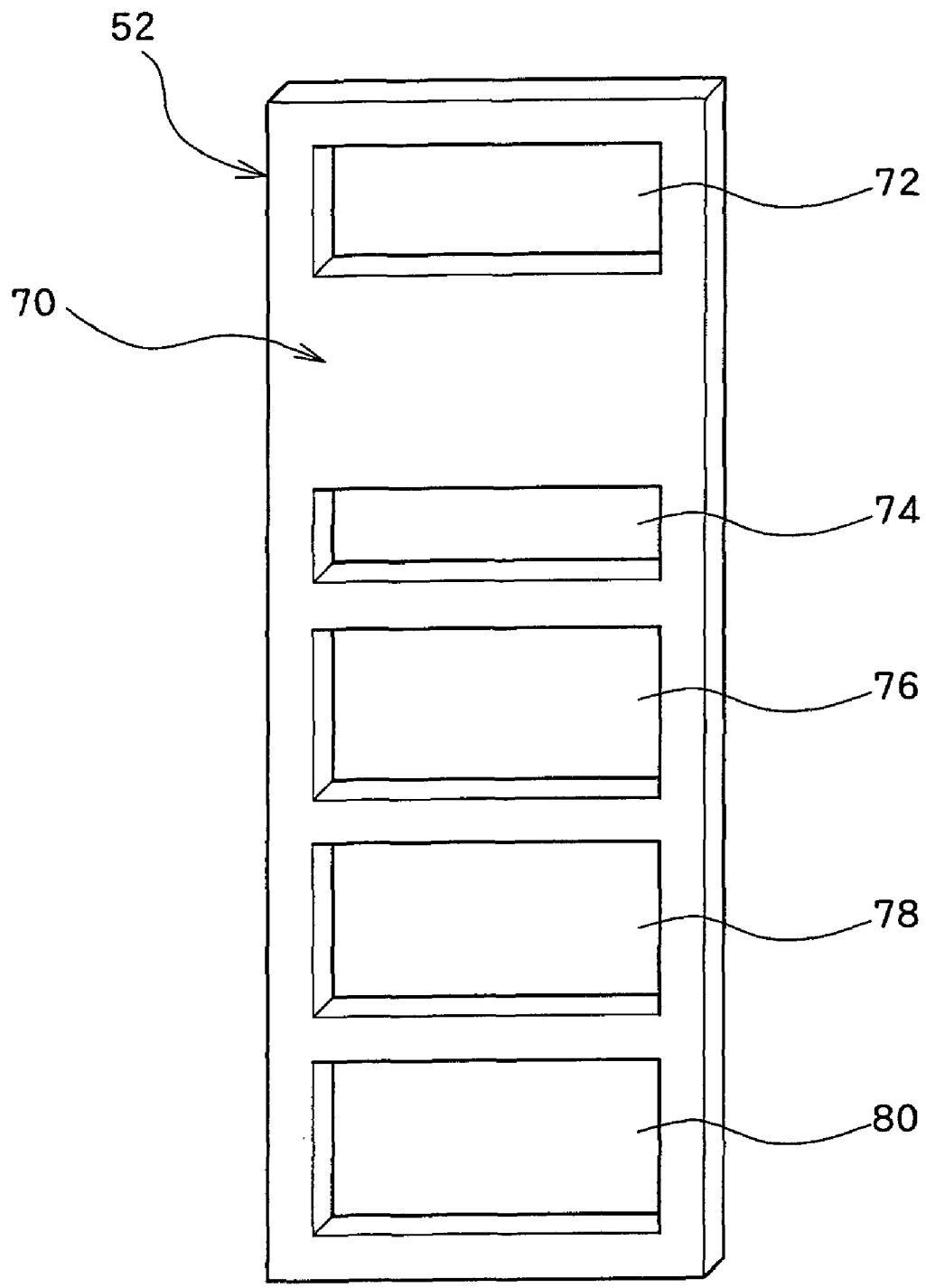
FIG. 3 is an illustration showing an example of a perforated plate.

The structure of the plate 52 shown in FIG. 1 will be described with reference to FIG. 3. The plate 52 is made of a resin of the same nature as the humidifying membrane chassis 34 and functions as a chassis enclosing the humidifying membrane 56 along with the humidifying membrane chassis 34. The plate 52 has five rectangular holes 72, 74, 76, 78 and 80 for the off-gas to flow through. The sizes and distribution of the holes are non-uniform. Specifically, a plate region 70 without holes is provided with a rectifying lattice at the part facing the through-hole 44. The plate region 70 exerts a function of shielding the humidifying membrane 56 to prevent the off-gas flowing through the through-hole 44 from impacting directly on the humidifying membrane 56 and a function of spreading the off-gas over the space 48. The holes 72 and 74 provided above and below the plate region 70 are relatively small. This is because the off-gas in the vicinity of the holes has higher pressure than the surrounding portion, and thus the flow rate of the off-gas flowing into the humidifying membrane 56 is relatively large even though the holes are small. On the contrary, the three holes 76, 78 and 80 in the lower part remote from the plate region 70 are relatively large, and are arranged to ensure a sufficient flow rate to the humidifying membrane 56 even under low pressure.

Figure 4:
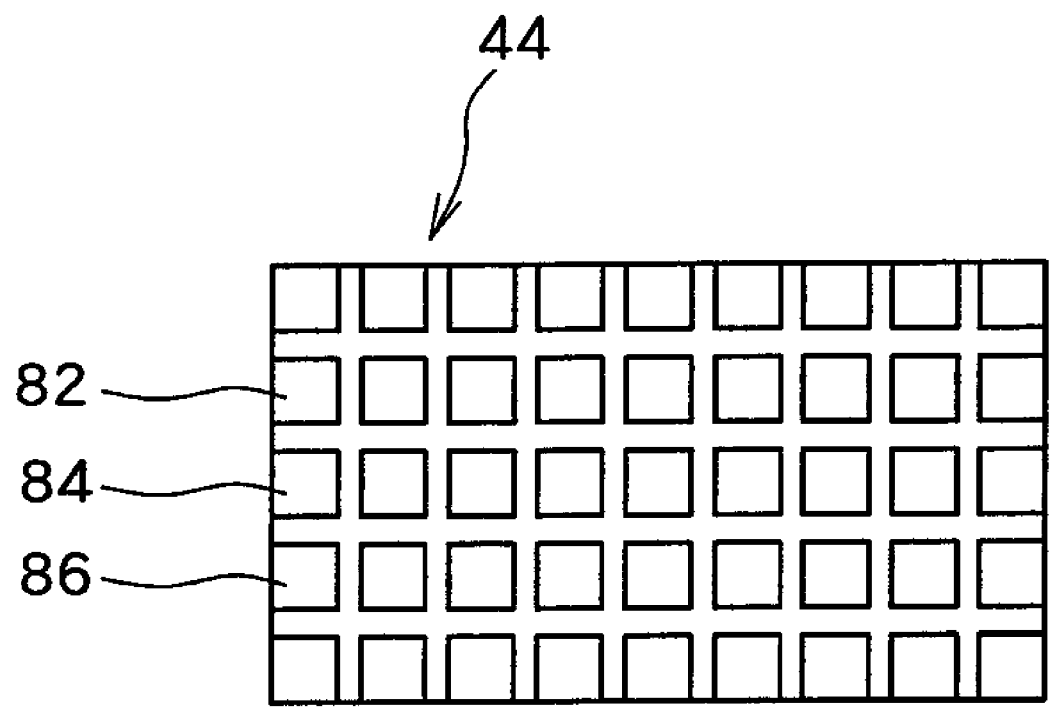
FIG. 4 is an illustration showing an example of a through-hole with a rectifying lattice.

The through-hole 44 with a rectifying lattice shown in FIG. 1 will be described with reference to FIG. 4. FIG. 4 is an illustration schematically showing the through-hole 44 with a rectifying lattice viewed at an angle looking from the outside of the humidifying membrane chassis 34. The through-hole 44 with a rectifying lattice is equipped with a lattice having a large number of small holes 82, 84, 86 and the like. The lattice extends in the depth direction of the figure and rectifies the flow of the off-gas passing therethrough. Accordingly, the off-gas, which is generally a turbulent flow, is rectified to a laminar flow, thereby stabilizing the flow of the off-gas entering the space 48.

Returning to FIG. 1, the operation of the humidifying membrane module 22 will be described. In the humidifying membrane module 22, compressed air is sent from the inlet port 28 into the assembly chassis 24. The space where the air enters is referred to as an air inlet flow path 58. The high-pressure air sent to the air inlet flow path 58 enters from the lower end of the humidifying membrane 56 into each of the hollow parts of the hollow fiber membranes. This is because there is no outlet, through which the air is discharged, in the air inlet flow path 58. For example, the sealing member 42 is provided in the gap between the humidifying membrane chassis 34 and the assembly chassis 24, and thus the air does not leak over the sealing member 42.

The air entering from the lower end of the humidifying membrane 56 is humidified by absorbing water (or water vapor) oozing through the membrane while proceeding in the hollow fiber membranes. The air flows out from the upper end of the humidifying membrane 56 and fills an air outlet flow path 60 produced between the upper end surface of the humidifying membrane chassis 34 and the lower surface of the upper wall of the assembly chassis 24. The air filling the air outlet flow path 60 does not leak over the sealing member 36 since it is sealed with the sealing member 36, and flows out completely from the upper outlet port 26. The air is then supplied to the fuel cell 12 through the air supplying path 18.

The highly humidified off-gas discharged from the fuel cell 12 is introduced to the inlet port 30 of the humidifying membrane module 22 through the air discharging path 20, and fills an off-gas inlet flow path 62 produced therefrom to the side surface of the humidifying membrane 56. At this time, the off-gas does not leak outside owing to the sealing members 36 and 38 provided on both sides, and flows completely into the inner space 48 through the through-hole 44 with a rectifying lattice. The off-gas thus flowing runs into the plate region of the plate 52 and is expanded throughout the space 48 to reach the side surface of the humidifying membrane 56 through the holes of the plate 52.

The off-gas reaches the opposite side surface of the humidifying membrane 56 through the gaps among the plural hollow fiber membranes constituting the humidifying membrane 56. In the process, water is transported into the interior of the hollow fiber membranes through the membrane. The off-gas thus flowing out from the humidifying membrane 56 flows in an off-gas outlet flow path 64 reaching the outlet port 32. Specifically, it passes through the holes of the plate 54 and reaches the outlet port 32 through the space 50 and the through-hole 46. In this process, the off-gas does not leak outside the off-gas outlet flow path 64 through the gap between the assembly chassis 24 and the humidifying membrane chassis 34 owing to the sealing members 40 and 42.

Figure 5:
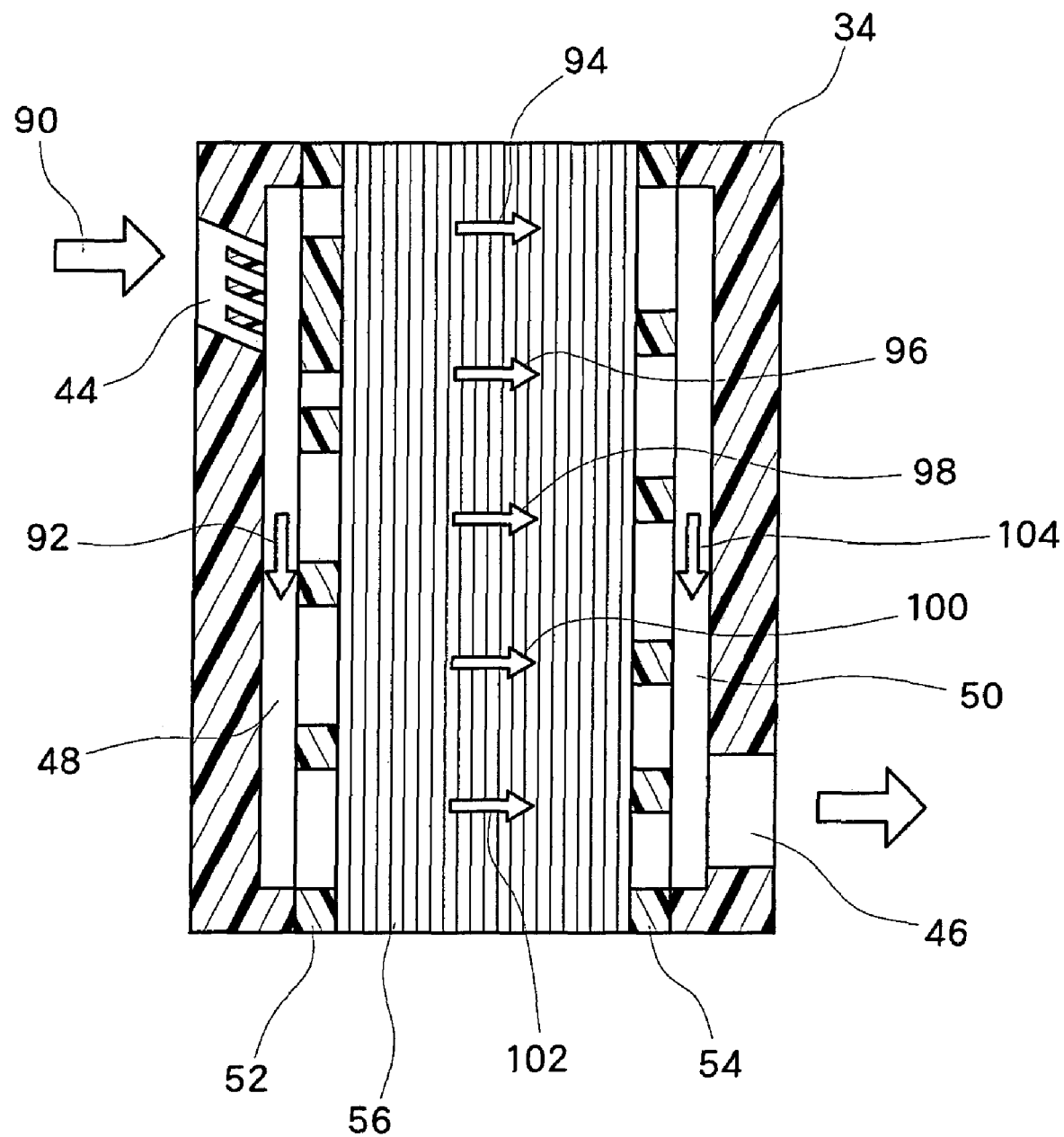
FIG. 5 is a schematic diagram showing flow of an off-gas.

FIG. 5 is a cross sectional view schematically showing the state of the off-gas flowing in the humidifying membrane chassis 34. The off-gas 90 entering through the inlet port 30 pervades throughout the space 48 as shown by a flow arrow 90 and enters into the humidifying membrane 56 through the respective holes in relatively uniform manner. The flow arrows 94, 96, 98, 100 and 102 show the state of the uniform flow. In the case where the off-gas flows through all the gaps of the humidifying membrane 56 substantially uniformly as in this case, the efficiency of the water exchange through the membrane is enhanced compared to the case where it is non-uniform. While FIG. 5 shows the flow of the off-gas on the cross sectional view, the off-gas uniformly flows similarly on the front side and the back side of the drawing In particular, since the humidifying membrane 56 is formed in a rectangular parallelepiped shape, the travel lengths of the off-gas flowing on the front side and the back side of the drawing are equivalent to each other, and thus the off-gas flows in equivalent amounts on the front side and the back side of the drawing. The off-gas flowing out from the humidifying membrane 56 flows and joins in the space 50 as shown by the flow arrow 104, and flows out from the through-hole 46 to the outside of the humidifying membrane chassis 34.

As described above, the humidifying membrane module 22 humidifies air by bringing air supplied to the fuel cell 12 into contact with the off-gas through the humidifying membrane 56. At this time, the off-gas and the air flow into the humidifying membrane 56 and flow out from the humidifying membrane 56 by being guided respectively with the flow paths formed by using the humidifying membrane chassis 34 and the assembly chassis 24. However, the flows thereof are sealed and are not mixed with each other owing to the sealing members 36, 38, 40 and 42 provided between the humidifying membrane chassis 34 and the assembly chassis 24.

The humidifying membrane module 22 is typically fabricated by installing the humidifying membrane chassis 34 equipped with the sealing members 36, 38, 40 and 42 into the assembly chassis 24. In the process of installation, there may be cases where the positions of the sealing members 36, 38, 40 and 42 are deviated due to friction with the assembly chassis 24. Accordingly, it is effective to fix the sealing members 36, 38, 40 and 42 by providing shallow grooves on the humidifying membrane chassis 34 at the mounting positions of the sealing members 36, 38, 40 and 42.

The invention claimed is:

1. A hollow fiber membrane module comprising:
a hollow fiber membrane bundled body that contains a rectangular parallelepiped hollow fiber membrane bundle having plural hollow fiber membranes bundled together, and the hollow fiber membrane bundled body has an outer periphery formed into a cylindrical shape along the entire length direction thereof;
an outer chassis that has a cylindrical part enclosing the hollow fiber membrane bundled body, and an inner periphery of the cylindrical part being formed into a cylindrical shape along the entire length direction thereof;
a first flow path that is formed by utilizing the outer chassis, introduces a first fluid into a hollow part of the hollow fiber membranes at one end of the hollow fiber membrane bundled body, and discharges the first fluid from the hollow part of the hollow fiber membranes at the other end of the hollow fiber membrane bundled body;
a second flow path that is formed by utilizing the outer chassis, introduces a second fluid into a space among the hollow fiber membranes on a side surface of the hollow fiber membrane bundled body, and discharges the second fluid from the space among the hollow fiber membranes on a side surface of the hollow fiber membrane bundled body; and
an annular sealing member that is provided between the outer periphery of the cylindrical shape of the hollow fiber membrane bundled body and the inner periphery of the cylindrical part of the outer chassis, to seal between a side of the first flow path and a side of the second flow path,
a fluid component being transported between the first fluid and the second fluid through the hollow fiber membranes,
wherein a rectangular perforated partition plate that expands the second fluid in the cylindrical axial direction to guide it to the side surface of the hollow fiber membrane bundle is provided in the second flow path, wherein the hollow fiber membrane bundled body has an inner chassis having a cylindrical part enclosing the hollow fiber membrane bundle from the side thereof, and the cylindrical part of the inner chassis is formed to have a cylindrical outer periphery along the entire length direction thereof, wherein the second flow path has a second inlet flow path that penetrates a side wall of the inner chassis at a certain position in the length direction thereof and introduces the second fluid into the side surface of the hollow fiber membrane bundle, and a second outlet flow path that penetrates the side wall of the inner chassis at another position in the length direction thereof and discharges the second fluid from the side surface of the hollow fiber membrane bundle, and further has an annular sealing member that is provided between an outer periphery of the cylindrical part of the inner chassis and an inner periphery of the cylindrical part of the outer chassis and seals between a side of the second inlet flow path and a side of the second outlet flow path, and wherein the second inlet flow path that penetrates the side wall of the inner chassis is formed as a through-hole with a rectifying lattice.

2. The hollow fiber membrane module according to claim 1, wherein the first flow path has a first inlet flow path that is formed on one end of the hollow fiber membrane bundle and introduces the first fluid to the one end of the hollow fiber membrane bundle, and a first outlet flow path that is formed on the other end of the hollow fiber membrane bundle and discharges the first fluid from the other end of the hollow fiber membrane bundle, and the sealing member seals between a side of the first inlet flow path and a side of the second flow path, or seals between a side of the first outlet flow path and a side of the second flow path.

3. A hollow fiber membrane module comprising:

a rectangular parallelepiped hollow fiber membrane bundle that has plural hollow fiber membranes bundled together, a first fluid flowing in a hollow part of the hollow fiber membranes from one end to another end;

an inner chassis that has a cylindrical part enclosing the rectangular parallelepiped hollow fiber membrane bundle from the side thereof, the cylindrical part thereof being formed to have a cylindrical outer periphery along the entire length direction thereof;

an outer chassis that has a cylindrical part enclosing the side surface of the inner chassis, the cylindrical part thereof being formed to have a cylindrical inner periphery along the entire length direction thereof;

a second inlet flow path that is formed by utilizing the outer chassis, penetrates a side wall of the inner chassis at a certain position in the length direction thereof and introduces a second fluid from the side surface of the hollow fiber membrane bundle into a space among the hollow fiber membranes;

a second outlet flow path that is formed by utilizing the outer chassis, penetrates the side wall of the inner chassis at another position in the length direction thereof and discharges the second fluid from the side surface of the hollow fiber membrane bundle; and an annular sealing member that is provided between the outer periphery of the cylindrical part of the inner chassis and the inner periphery of the cylindrical part of the outer chassis and seals between a side of the second inlet flow path and a side of the second outlet flow path, a fluid component being transported between the first fluid and the second fluid through the hollow fiber membranes wherein a rectangular perforated partition plate that expands the second fluid in the cylindrical axial direction to guide it to the side surface of the hollow fiber membrane bundle is provided between the inner chassis and the hollow fiber membrane bundle in the second inlet flow path, wherein the second inlet flow path that penetrates the side wall of the inner chassis is formed as a through-hole with a rectifying lattice.

4. The hollow fiber membrane module according to claim 1, wherein the hollow fiber membranes and the inner chassis each comprise the same resin or different resins that can absorb a difference in thermal expansion between them, the outer chassis comprises a metal, and the annular sealing member comprises a compressible material that can absorb a difference in thermal expansion between the inner chassis and the outer chassis.

5. The hollow fiber membrane module according to claim 3, wherein the hollow fiber membranes and the inner chassis each comprise the same resin or different resins that can absorb difference in thermal expansion between them, the outer chassis comprises a metal, and the annular sealing member comprises a compressible material that can absorb a difference in thermal expansion between the inner chassis and the outer chassis.

6. The hollow fiber membrane module according to claim 1, wherein the rectangular perforated partition plate that expands the second fluid in the cylindrical axial direction to guide it to the side surface of the hollow fiber membrane bundle is provided between the inner chassis and the hollow fiber membrane bundle in the second inlet flow path.

7. The hollow fiber membrane module according to claim 6, wherein holes of the perforated partition plate are not provided in an area of the partition plate that is directly impacted by the second fluid introduced through the inner chassis, or holes are provided in the area of the partition plate that is directly impacted by the second fluid introduced, wherein the hole area in the area of the partition plate that is directly impacted by the second fluid introduced is smaller than the hole area in other areas of the partition plate.

8. The hollow fiber membrane module according to claim 3, wherein holes of the perforated partition plate are not provided in an area of the partition plate that is directly impacted by the second fluid introduced through the inner chassis, or holes are provided in the area of the partition plate that is directly impacted by the second fluid introduced, wherein the hole area in the area of the partition plate that is directly impacted by the second fluid introduced is smaller than the hole area in other areas of the partition plate.

9. The hollow fiber membrane module according to claim 6, wherein a hole area of the perforated partition plate increases as a distance from an area of the partition plate that is directly impacted by the second fluid introduced through the inner chassis, is increased in the lengthwise direction.

10. The hollow fiber membrane module according to claim 3, wherein
a hole area of the perforated partition plate is increased as a distance from an area of the partition plate that is directly impacted by the second fluid introduced through the inner chassis, is increased in the lengthwise direction.

11. A fuel cell system comprising:
the hollow fiber membrane module according to claim 1; and
a fuel cell that produces electric power by performing chemical reaction producing water with hydrogen and oxygen supplied,
one of the first fluid and the second fluid being a fluid containing oxygen supplied to the fuel cell, the other thereof being a fluid containing water produced in the fuel cell, and
the hollow fiber membrane module transporting at least some of water produced in the fuel cell to the fluid containing oxygen supplied to the fuel cell, so as to humidify the fluid.

12. A fuel cell system comprising:
the hollow fiber membrane module according to claim 3; and
a fuel cell that produces electric power by performing chemical reaction producing water with hydrogen and oxygen supplied,
one of the first fluid and the second fluid being a fluid containing oxygen supplied to the fuel cell, the other thereof being a fluid containing water produced in the fuel cell, and
the hollow fiber membrane module transporting at least some of water produced in the fuel cell to the fluid containing oxygen supplied to the fuel cell, so as to humidify the fluid.

13. The hollow fiber membrane module according to claim 1, wherein the through-hole with the rectifying lattice tilts and descends toward the rectangular parallelepiped hollow fiber membrane bundle.

14. The hollow fiber membrane module according to claim 13, wherein a rectangular parallelepiped space is located between the inner chassis and the rectangular perforated partition plate.

* * * * *